Nov. 10, 1953  D. MURPHY  2,658,775
SEAL
Filed Sept. 24, 1949  2 Sheets-Sheet 1

INVENTOR.
Daniel Murphy.
BY
Christy Parmelee & Strickland
ATTORNEYS-

Nov. 10, 1953
D. MURPHY
2,658,775
SEAL
Filed Sept. 24, 1949
2 Sheets-Sheet 2
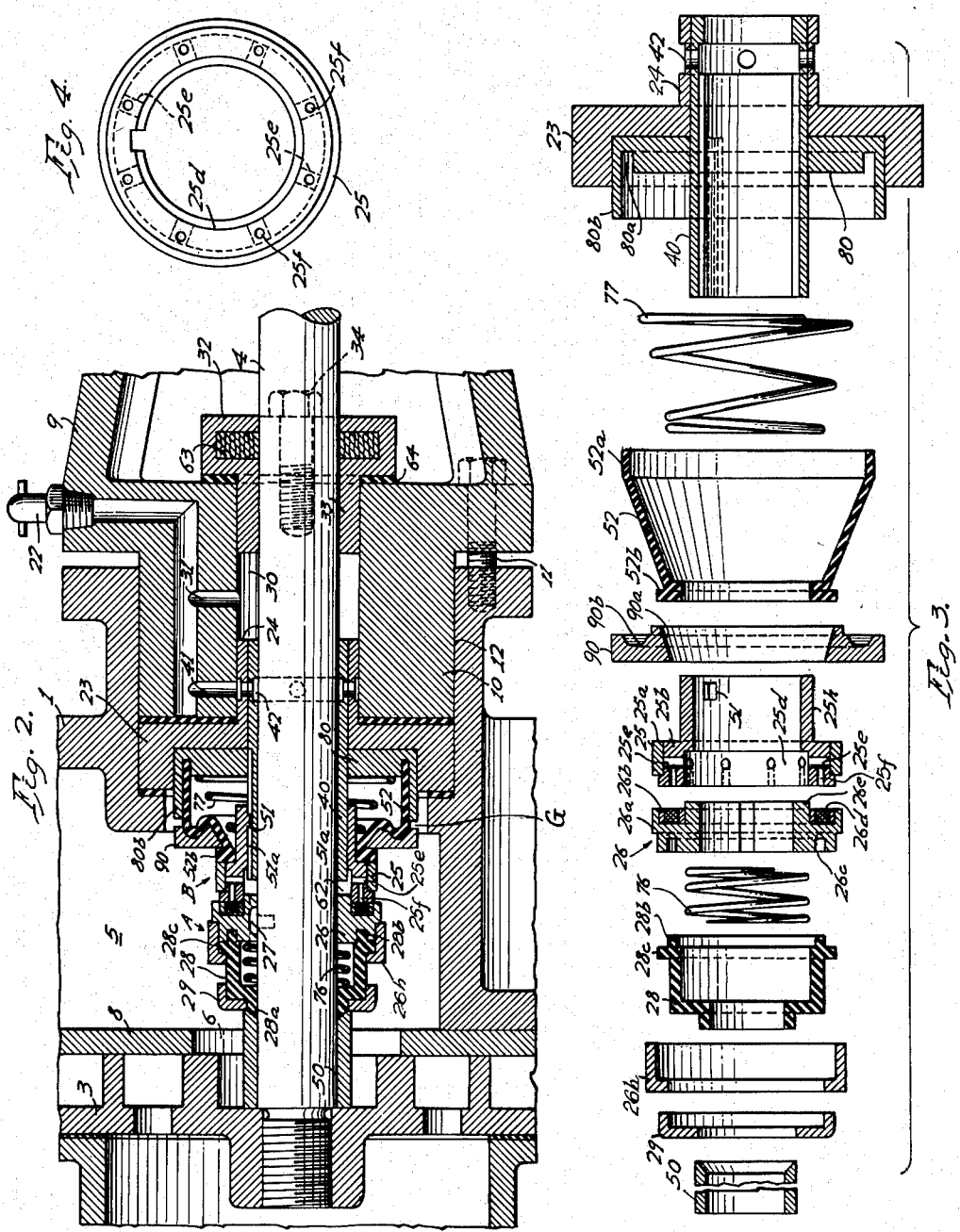
INVENTOR.
Daniel Murphy
BY
Christy Parmeler & Strickland
ATTORNEYS- Patented Nov. 10, 1953

2,658,775

UNITED STATES PATENT OFFICE 2,658,775

SEAL

Daniel Murphy, New Castle Pa.

Application September 24, 1949, Serial No. 117,613

2 Claims. (Cl. 286—11)

My invention relates to seals for rotary shafts, and particularly to seals for the shafts of rotary pumps.

In United States Letters Patent No. 2,251,020, granted to me August 8, 1944, I disclose a pump which has enjoyed success in pumping "slip" in the pottery industry, and in United States Letters Patent No. 2,453,249, granted to me November 9, 1948, and in United States Letters Patent No. 2,505,868, granted to me May 2, 1950, I illustrate and describe certain new and useful improvements in seals for the rotating shaft of such a pump.

My present invention consists in further improvements in such seals or sealing devices, whereby the devices become effective not only to make the rotating shaft secure against the escape of the fluid being pumped, but also to withstand and retain lubricant injected in the shaft bearings under the high pressure of a lubricant gun or pump.

The invention will be understood upon reference to the accompanying drawings, in which:

Fig. 2 is a fragmentary view, showing partly in side elevation and partly in vertical section, the structure of such sealing device and the adjacent parts of the pump to larger scale;

Fig. 3 is an "exploded" view, showing the several elements of the sealing device in proper relative positions for assembly; and Fig. 4 is a view in front elevation of one of the seal members.

Figure 1:
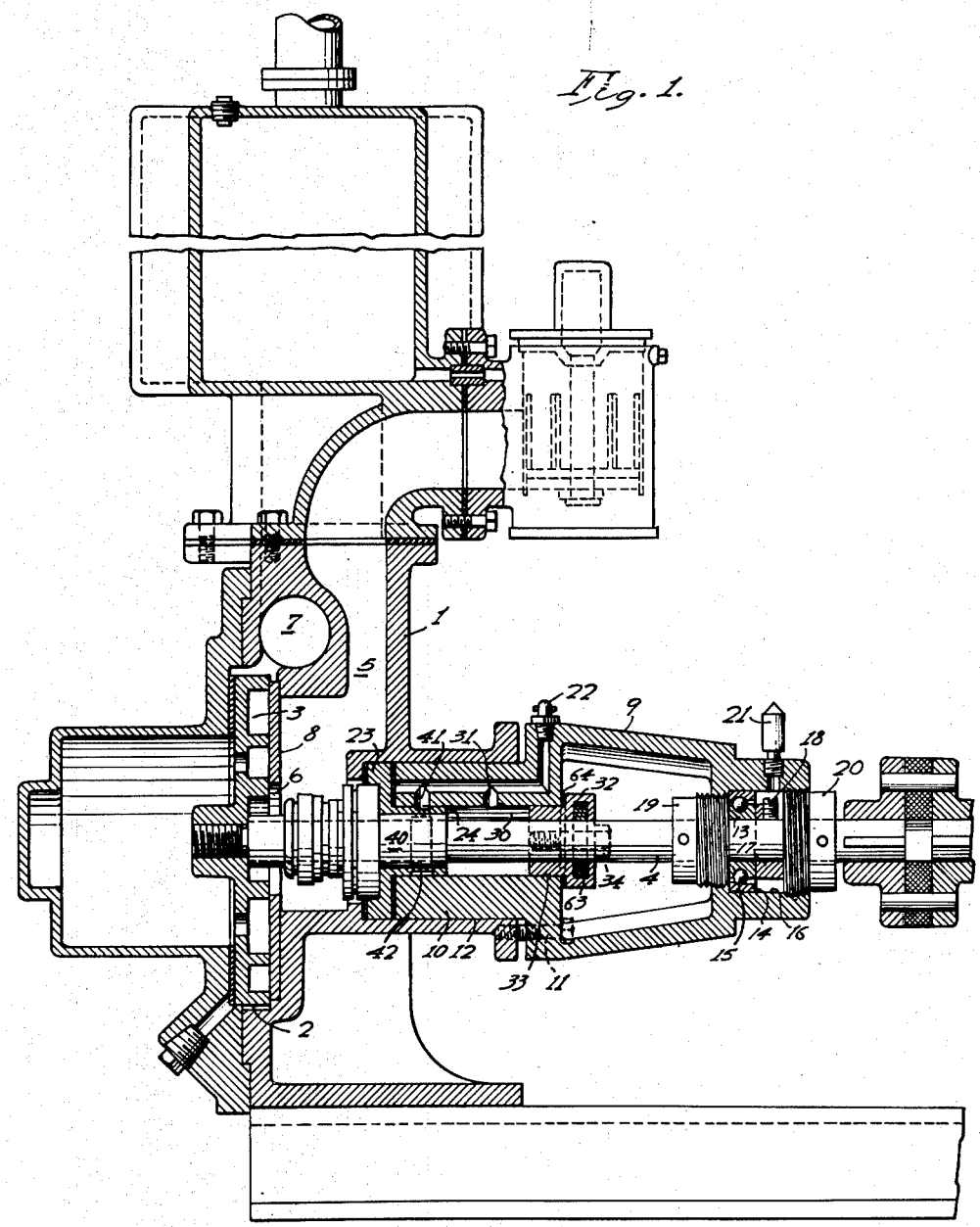
Fig. 1 is a view, partly in side elevation and partly in vertical section, of a pump in which a sealing device of the invention is organized.

The pump shown in the drawings comprises a body 1, within which is formed the usual impeller chamber 2, and within the chamber a vaned impeller 3 is borne upon a rotary shaft 4. Under the influence of the rotating impeller, liquid is drawn from an intake passage 5 through the eye 6 of the pump, and is delivered at the periphery of chamber 2 to a discharge passage 7. When the pump is in operation, the pressure exerted upon the rotating impeller, holds the impeller in abutment upon the side wall on the right (as seen in Fig. 1) of the pump chamber 2. This side wall is advantageously formed as a removable and replaceable plate 8.

The body 1 of the pump carries rigidly mounted upon it a windowed housing 9; and within the housing two bearings are formed, which rotatably support the shaft 4 of the impeller. The shaft 4 at its outer end (to the right, Fig. 1) is adapted to be coupled to, or otherwise brought into power-transmitting connection with, a suitable motor; and the mounting of the shaft in said two spaced-apart bearings is effective to prevent whipping of the shaft when the pump is in operation.

One of the bearings includes an annular block 10, conveniently made in one piece with the housing 9; and the block 10, together with the integral housing, is secured by set-screws 11 in a cylindrical seat 12, formed exteriorly upon the body 1 of the pump. The other bearing consists of concentric rings 13 and 14 with rolling members, here shown to be balls 15, arranged in the race formed for them by and between the rings. The inner ring 13 fits snugly upon the shaft 4; the outer ring 14 fits snugly within, and is adapted to slide longitudinally within a bore 16 formed in the housing 9. The bearing 13, 14, 15 abuts laterally upon a ring 17, which, by means of a set-screw 18, is secured to the shaft 4. The assembly of bearing and ring is held between two nuts 19 and 20, that, encircling the shaft 4 and movable freely along shaft 4, make screw-threaded engagement with the bore 16. The windows in the housing 9 afford access to the inner nut 19, for adjusting it.

Means are provided for lubricating the two bearings, consisting of a lubricant cup 21 and a lubricating fitting 22, with ducts leading to the bearing surfaces.

It will be seen that in the second bearing (the bearing to the right), and particularly in the ring 17 and the cooperating nuts 19 and 20, means are found for adjusting the shaft 4 longitudinally, to compensate for the wear of the impeller 3 upon the plate 8.

It is requisite that provision be made against a withdrawal of lubricant from the bearings by the suction of the operating pump, and against ingress to the bearings of the liquid that is pumped, a supply of which remains standing in passageway 5 when the pump is at rest. In the means to such end, the improvements of my present invention are found.

In the seating of the bearing block 10 in the body 1 of the pump an annular shaft-encircling plate 23 is, by the screws 11, clamped to place at the left-hand end (Fig. 1) of the cylindrical seat 12, forming in effect an integral part of the stationary pump body, as well as an effective part of the seal structure, presently to be described. This annular plate is provided with a rigid shaft-encompassing sleeve or cylindrical extension 24. The extension is in this case integral with the plate. The plate 23 with its sleeve-like extension 24, when clamped to place, constitutes within block 10 the bearing member proper. The extension 24 carries interiorly a bronze bushing 40, within which the shaft turns. Lubricant ducts are indicated at 41, 42. The annular plate 23 is clamped with sealing effect to the wall of the pump casing, and its integral sleeve-like extension is the immediate bearing member for the shaft.

In the assembly the plate 23, with its bronze-bushed extension 24, snugly encircles the shaft. The fit is, however, not so snug as to exert any restraint upon the free turning of the shaft within the sleeve. A cylindrical space 30, formed by and between the shaft 4 and the block 10, is closed to the left by the plate 23 with its extension 24, and to the right is closed by a block 32 having a sleeve-like extension 33 that is adjustably anchored in the bearing block 10 by set-screws 34. This chamber 30 is normally filled with a supply of lubricating grease delivered under high pressure through passage 31. The block 32 may include within its outer end a channel in which a felt packing 63 is contained, and between the block and the body 10 of the bearing a rubber gasket 64 is clamped, thus preventing the escape of grease outward from chamber 30.

A sealing structure cooperates with the shaft-encompassing member 23 to prevent liquid from being sucked into the pump from the bearing structure when the pump is in operation, and alternately to prevent liquid from draining from the pump into the bearing structure when the pump is at rest. The sealing structure comprises essentially two seal members or devices A and B, one rotatable with the shaft 4 and the other secured against rotation, with the two arranged in yielding abutment upon one another on sealing surfaces extending annularly of the shaft 4. The first seal member or device A comprises a collar portion 26 keyed, as at 27, to the shaft 4. The collar portion 26 is thus made to rotate with the shaft, while being adapted to slide on the shaft to maintain, as presently will appear, snug contact with a collar portion 25 of the second seal member or device B.

Organized with the collar portion 26 is a tubular member of sleeve 28 formed of a flexible and elastic material that is resistant to deterioration under the effects of both the liquid being pumped and the lubricant used in the bearing structure. A synthetic rubber known on the market as "Neoprene" has been found to be a suitable material of which to form the member 28, but it will be understood that the invention is not predicated upon the selection of the particular material which may be used. Important characteristics of the member 28 are that it is mounted in shaft-encircling position; that at one end of its tubular or ring-like body it is wedged, as at 28a, against the chamfered edge of a rigid sleeve 50 on the shaft, and by means of a keeper ring 29 is secured in sealed union to the body of the shaft. The body of member 28 includes a flange 28b that fits a groove 26c formed in the collar portion 26, where it is secured in liquid-tight union by means of a keeper 26h which engages a flange 28c on member 28 and is drift-fitted to the body of collar 26. The assembled seal member or device A is adapted to rotate in unison with the shaft 4, and the collar portion 26 is free to move axially of the shaft against, and assisted by, or the force of a spring 76 arranged as shown. Preferably, if not essentially, the elastic body of the member 28 is axially compressed in the assembly whereby member 28 cooperates with the spring 76 to press and maintain the collar portion 26 in snug "running" contact with the fact of the wearing or collar member 25. A sealed engagement of the relatively rotatable portions 25 and 26 is maintained both when the pump is in operation and when it is idle. The member 28, by virtue of its elastic nature and organization in the assembly, is adapted axially to expand and retract to maintain such sealed engagement even though a slight misalignment exists between the relatively rotatable parts.

The collar portion 26 of the seal member or device A is herein shown to be formed of a steel portion 26a and an annular brass portion 26b having lubricating graphite inserts 26d.

The proportions and dimensions of the several elements of the sealing device are such that, when the elements are assembled on the shaft, the screwing of the body of the impeller into place on the threaded end of the shaft will compress the spring 76. The seal assembly A is liquid-tight and capable of withstanding the high pressure of lubricant which is injected through the fitting 22 into the shaft bearings, and which works its way along the shaft to the chamber that houses the spring 76 within the flexible sleeve member 28.

A slight clearance is provided between the collar member 26 and the shaft 4, so that the collar may wobble in the event that there is any misalignment of the rotating parts, and by such wobbling to maintain tight surface-to-surface contact with the wearing member 25. However, if there is substantial wear of the bearings, or if the bearings as originally provided have a running tolerance substantially more than one thousandth of an inch, the lateral play of the shaft may in time result in unequal wear between the collar members or portions 26 and 25, with the result that leakage will develop. It is in contravention of this undesirable consequence that the collar portion 25 of the seal member or device B is formed separately from the bearing portion 23 and its complementary part 80. The portion 25 is adapted to wobble sympathetically with the collar member 26 and thereby maintains the desired fluid-tight engagement in spite of any misalignment of the rotating parts.

As shown in the drawings, the member 25 comprises a two-piece structure; that is, a brass ring 25a within which is secured a ring 25b of such bearing material as cast iron. The ring 25b at its left-hand end extends from the ring portion 25a and provides the shaft-encircling face against which the collar member 26 bears, while at its right-hand end the ring 25b is continued in a bearing sleeve portion 25h. The bushing 40 is extended to the left of the stationary bearing portion 23 to receive the seal member 25 in a loose fit, and a key 51 on sleeve portion 25h engages a slot 51a in bushing 40 and secures the member 25 against rotation, while permitting to required degree the axial and angular movements of such member relatively to the stationary bearing portion. The member 25 is sealed to the stationary bearing portion by means of a flexible shaft-encompassing sleeve 52 formed in this case of the same material as the sealing element 28.

The body of the sleeve is frusto-conical in form, having at its larger end a lip or edge 52a that is received in a groove 80a formed in the insert or auxiliary portion 80 of the stationary bearing or plate portion 23. The smaller end of the frusto-conical sleeve is formed to fit snugly upon the extension 25h of seal member 25, and is clamped thereon by means of a collar 90 having a tapered bore 90a (Fig. 3) that engages the conical surface of the sleeve 52. The sleeve has a flange 52b that is sprung through the bore of collar 90, as shown in Fig. 2. The collar 90 is recessed as shown at 90b, whereby when the seal parts are assembled and compressed axially on the shaft part of the frusto-conical body of the sleeve 52 is buckled or turned back, or reversely curved, and caused to form a bulge that snugly fits the annular recess 90b, while the remainder of such frusto-conical body is pressed to cylindrical form and externally reinforced and supported by a cylindrical annular extension or portion 80b on the stationary insert 80 of the bearing member 23. The frusto-conical flexible sleeve, sealed to and extending between seal member 25 and stationary body portion 80, is enclosed between and within the portions 90 and 80b, and such portions provide a complete metal encasement of the flexible sleeve 52, with the exception of a narrow, open, circumferential clearance G between the portions. The encased flexible sleeve is very effective to withstand the high pressures of lubricant delivered to the bearing structure and filling the reservoir within the flexible sleeve. A spring 77 in such reservoir simply serves to oppose the spring 76 of the first sealing device described, and to keep the annular sealing surfaces of the members 25 and 26 in the desired yielding contact.

Provision is made to assist the graphite inserts 26d in lubricating the contacting faces of the members 25 and 26. Advantageously, the bore of the member 25 is enlarged for a part of its extent as indicated at 25d in Fig. 4, to provide when assembly has been made, Fig. 2, a chamber 62 for a supply of lubricating grease. Within the body of the inner ring 25b of the member, a plurality of pockets 25e is formed, the pockets extending radially from the enlarged bore portion 25d and being located at points spaced apart circumferentially of the member 25. And from each of said bores 25e a small passage 25f leads to the face of the wearing member that makes contact with the collar 26. The pockets 25e are in this case ⅛ inch in diameter—the passages $\frac{1}{16}$ inch, and the mouth of each passage is countersunk to eliminate sharp edges on the face that receives the face of the rotating collar member 26.

When making assembly of the sealing device, the chamber 62 and the bores and passages 25e and 25f are packed with lubricating grease, and when the pump is in operation this grease works its way to the meeting faces of the relatively rotating members 25 and 26 and lubricates them.

The lubricant supplied through the passages 31 and 41 may be forced, under the high pressure of a grease pump connected to the fitting 22, between the shaft 4 and the bushing 40 and into the chamber 62, to replenish the supply of lubricant as needed. In fact, not only is the chamber 62 thus charged, but the reinforced spaces within the sealing members 28 and 52 may be also filled, to serve as reservoirs of lubricant.

The bores and passages 25e and 25f have a second utility. They function to augment the dissipation of the heat generated by the friction between the faces of the rotating collar member 26 and the non-rotating member 25. But for the heat dissipation thus obtained, the effective life of the seal would be impaired; that is, no matter how efficient the lubrication is, substantial heat tends to develop and endanger the life of the rubber sealing members 28 and 52. The augmented dissipation of heat provided by the feature described eliminates this danger.

It will be perceived that I have sealed the passage of the pump shaft through the wall of the pump against leakage, by means of a simple organization, and that I have provided a bearing for the pump shaft that is easily assembled and separated. As in course of operation the wearing plate 8 and the impeller 3 are worn away, they may readily be removed and replaced, and that as operation continues the adjustment nuts 19 and 20 constitute means for compensating for the wear.

It is to be remarked of the seal structure described that the wearing member 25 is mounted independently of the shaft 4 on the stationary extension of the bushing or sleeve 40 that carries the shaft load within the bearing member 23, and, while being secured by key 51 against rotation, the member 25 is assembled with a loose fit, whereby it is free to "float" and to wobble in all directions, in order to obtain self-alignment with the associated rotating parts. The bushing 40 extends from the bearing member 23 a sufficient distance to provide ample support for the floating member 25, and it will be noted that the flexible externally reinforced member 52 allows the member 25 to move away from the member 23 to maintain contact with collar 26 without breaking the seal. At the same time the flexible member 28 with equal pressure urges the floating collar 26 into self-aligning contact with member 25. Thus, the rotating members 29, 28 and 26, and the non-rotating members 25 and 52 comprise a "floating" seal that is yieldingly held in assembly between the stationary member 23 and the sleeve 50 that rotates with the shaft 4. The engagement of the collar 28b of member 28 in groove 26c seals the member 28 to the collar 26, and maximum flexibility and self-aligning activity of the parts may be obtained, it being manifest that the keyed union 27 of the collar 26 to the shaft relieves the member 28 from torque, just as the keyed union of member 25 to bushing 40 safeguards the elastic member 52 from torque. These features of the sealing device are of particular value in rotary pumps in which end play usually develops in the impeller shaft, and the bearings sooner or later wear out of true with the shaft. It will be understood that if both sealing members 25 and 26 were mounted immediately on the shaft 4, with one member held against rotation and the other rotating with the shaft, the desired effect would not be obtained, for if the bearing ran out of true by as much as three thousandths of an inch the two contacting seal members 25 and 26 in relative rotation would chatter or repeatedly hit at two points spaced 180° apart with respect to the axis of the shaft, and thus would form an opening between such members that would destroy the seal and cause leakage. This I have discovered by experience, and the objection is eliminated in the structure of my present invention.

Another important feature of the invention is to be noted. I have discovered that, while the individual floating or wobbler mounting of the rotating and non-rotating seal members 26 and 25, respectively, tends to maintain the bearing faces of the two seal members in the desired fluid-tight running contact, there is a relative lateral play or oscillation between the seal members. It is a play or oscillation that is effective to produce a wiping action between the snugly contacting and relatively rotating faces of the two members—a rubbing action that is effective, back and forth, on lines that extend radially of the axis of the shaft 4, an action that is caused by one member (25 or 26) being eccentric relatively to the other even though their meeting faces may be maintained in snug surface-to-surface contact. This rubbing action tends to produce a condition that sucks the lubricant out of the reservoir 62, causing the engaged and relatively rotating faces of the members 25 and 26 to run dry, with the effect that the fluid-tight seal is impaired, and particles of abrasive are admitted from the pump chamber or passage 5 into the seal structure, thereby destroying its effectiveness.

In overcoming this objection, I provide an annular shoulder that extends from the bearing face of one of the seal members (25, 26) into a recess in the other seal member. In this case the ring 26 is provided with a shoulder 26e that extends from the annular bearing face of the ring, and in the assembly (Fig. 2) extends into the bore portion 25d of the ring 25, but such extension of the portion 26e into the bore portion 25d does not so completely fill such bore portion as to impair the bore portion's function as a reservoir for lubricant. The fit of the shoulder formed by the extending body of ring portion 26e in the bore of ring 25 does not inhibit the wobbling of the two rings in the manner required to maintain a snug running contact between the engaged bearing faces of the two rings, but the fit is effective to prevent the relative oscillating or side shimmying of the two seal members 25 and 26.

After a prolonged and adequate period of service, it may develop, as in any piece of machinery whose parts are subject to wear, that the seal members will require renewal. In my structure this may be accomplished without tearing down the pump. It is necessary only to disconnect the coupling of the shaft 4 to its driving motor, and then remove the housing 9 from the shaft and the pump body 1. Access to the sealing device is thereby afforded. And in case a leak should develop in the sealing device at a time when it is inconvenient to make immediate repair, the block 32 may be removed, and packing placed in the chamber 30. Then the block may be reassembled and tightened against the packing. In this fashion the pump may be operated until such time as the sealing device can be renewed.

The sealing device described will prove useful in many apparatus, other than pumps, in which it is desirable to seal a rotating shaft against the escape of fluid while providing for high pressure lubrication of the bearings and relatively rotating parts, and within the scope of the appended claims such varied utility of the sealing device, as well as many variations and modifications in the structure of the device, are held in contemplation.

I claim:

1. A seal for a rotary shaft extending through a stationary body, said seal comprising two shaft-encompassing devices, one rotatable with the shaft and the other secured against rotation, and arranged yieldingly to abut upon one another on sealing surfaces that extend annularly about the shaft, said device which is secured against rotation comprising a shaft-encompassing member having a rigid bushing portion engaging said shaft, a second shaft-encompassing member having a sleeve extension telescoped in a loose fit upon said bushing portion and keyed thereto to permit relative wobbling movement of said members with their telescoped portions axially of said shaft, a flexible shaft-encompassing sleeve extending between and secured at its opposite ends to said members, a collar portion clamping one end of said flexible sleeve to the sleeve extension of said second member, and a cylindrical extension on the first-mentioned member radially spaced from and concentric with the bushing portion thereof, said collar portion and said cylindrical extension forming between said members an enclosure that embraces and externally supports the wall of said flexible sleeve in substantially its entire extent between said shaft-encompassing members, whereby an enclosed and reinforced chamber is provided to receive high-pressure lubrication, said collar portion including an annular recess concentric with said shaft, the wall of said flexible sleeve in its extent between said members including a reversely curved portion that is snugly engaged and supported in said recess.

2. A seal for a rotary shaft extending through a stationary body, said seal comprising two shaft-encompassing devices, one rotatable with the shaft and the other secured against rotation, and arranged yieldingly to abut upon one another on sealing surfaces that extend annularly about the shaft, said device which is secured against rotation comprising a shaft-encompassing member having a rigid bushing portion engaging said shaft, a second shaft-encompassing member having a sleeve extension telescoped in a loose fit upon said bushing portion and keyed thereto to permit relative wobbling movement of said members with their telescoped portions axially of said shaft, a flexible shaft-encompassing sleeve of frusto-conical form extending between and secured at its opposite ends to said members, a collar portion clamping one end of said flexible sleeve to the sleeve extension of said second member, and a cylindrical extension on the first-mentioned member radially spaced from and concentric with the bushing portion thereof, said collar portion and said cylindrical extension forming between said members an enclosure that embraces and externally supports the wall of said flexible sleeve in substantially its entire extent between said shaft-encompassing members, whereby an enclosed and reinforced chamber is provided to receive high-pressure lubrication, said collar portion including a conical bore that externally engages said flexible sleeve for a part of its extent axially of said shaft, said collar portion also including radially outward from said conical bore an annular recess, and the wall of said flexible sleeve in its extent from said conical bore being reversely curved in a portion that is snugly engaged and supported in said recess.

DANIEL MURPHY.

References Cited in the file of this patent

UNITED STATES PATENTS

| Number | Name | Date |
|---|---|---|
| 2,226,001 | La Bour | Dec. 24, 1940 |
| 2,250,348 | Beier | July 22, 1941 |
| 2,365,351 | Matter | Dec. 19, 1944 |
| 2,399,764 | Schilling | May 7, 1946 |
| 2,444,713 | Solari | July 6, 1948 |
| 2,479,178 | Murphy | Aug. 16, 1949 |
| 2,505,868 | Murphy | May 2, 1950 |